May 6, 1924.
O. A. WIBERG
1,493,408
RADIAL GAS OR STEAM TURBINE
Filed Dec. 26, 1922
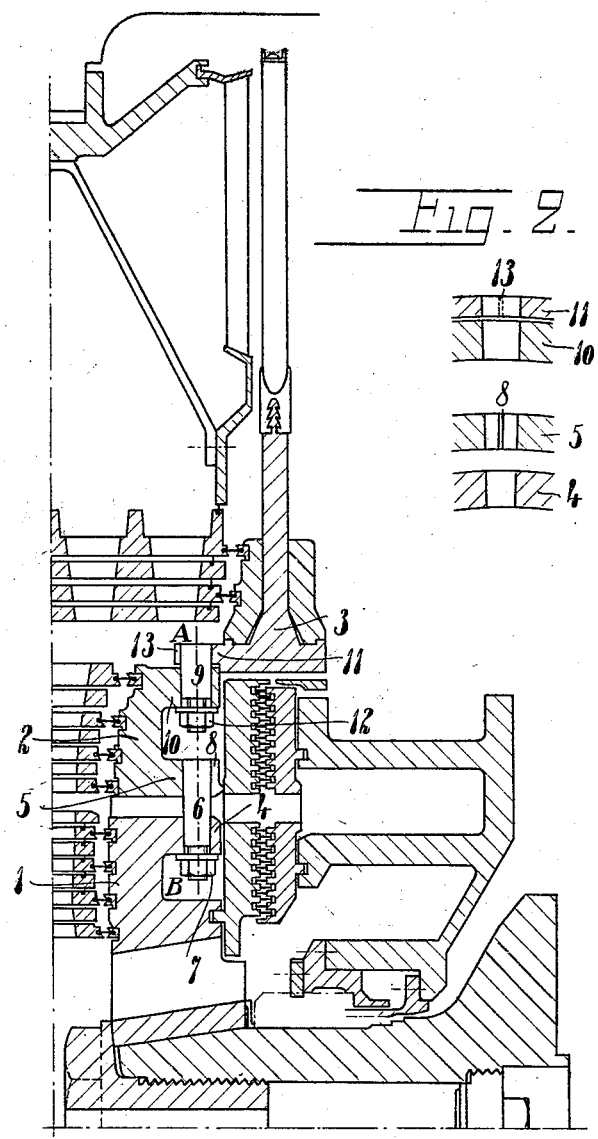
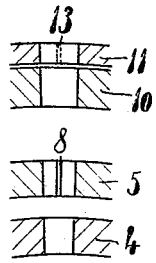

Patented May 6, 1924.

1,493,408

UNITED STATES PATENT OFFICE.

OSCAR ANTON WIBERG, OF FINSPONG, SWEDEN.

RADIAL GAS OR STEAM TURBINE.

Application filed December 26, 1922. Serial No. 609,049.

*To all whom it may concern:*

Be it known that I, OSCAR ANTON WIBERG, a citizen of the Kingdom of Sweden, residing at Finspong, Sweden, have invented new and useful Improvements in Radial Gas or Steam Turbines, of which the following is a specification.

This invention relates to improvements in radial gas or steam turbines, and especially to turbines of the kind in which the turbine disks are divided in two or more annular elements of which a larger element surrounds a smaller one in order that parts of the disks situated at different distances from the centre thereof may be capable of expanding more or less independently of each other when assuming different temperatures in running.

The object of the invention is to provide means for securing such annular elements to each other whereby the connection between the various parts will be completely firm and reliable under all circumstances and will not be affected by different temperatures on the different disk elements nor by the centrifugal force.

To this end the invention involves the provision of conical radial bolts to hold the said elements together.

In the accompanying drawing, Figure 1 is an axial section of one half of a divided turbine disk the elements of which are held together by means of conical bolts. Fig. 2 is a detail-section on the line A—B, Fig. 1, with the securing bolts removed.

With reference to the drawing, the numerals 1, 2 and 3 indicate three annular elements of a disk of a radial turbine. The elements 1, 2 and 3 surround each other, reversely to the order stated. The elements 1 and 2 are formed with peripherally extending flanges 4 and 5, respectively, on their side faces facing each other. Formed in said flanges are radial borings tapering conically inwards. Inserted in said borings are accordingly conical bolts 6 of which one is shown in Fig. 1. Said bolt is secured in place and tightened by means of a nut 7 screwed on the threaded inner end of the bolt and bearing against the inner surface of the flange 4. Formed in the flange 5 outside the bolt 6 is a slot 8, see also Fig. 2, for the purpose of obviating unduly heavy stresses of the material around the borings engaged by the bolts 6.

The connection between the disk elements 2 and 3 is likewise effected by means of radial bolts tapering inwardly. One of said bolts is shown at 9 in Fig. 1. The bolt 9 extends through an inwardly tapering hole formed in a flange 10 of the member 2 as well as through a corresponding hole formed in a flange 11 of the member 3 and is held in place and tightened by means of a nut 12 screwed on the threaded inner end of the bolt 9 and bearing against the inner surface of the flange 10. Also in this case the outer flange, viz, 11, is slit outside the bolt 9, as shown at 13, Figs. 1 and 2.

In operation, the part of the turbine disk forming the hub thereof is hotter than the peripheral parts of the disk; furthermore, the action of the centrifugal force is greater on said peripheral parts than on said hub part.

This will cause heavy internal stresses within the material of the disk.

Both the increase of temperature and the centrifugal force will, of course, act on the flanges 4 and 5 and 10 and 11 and tend to increase the dimensions thereof. This will in turn cause a change of the dimensions of the holes engaged by the bolts 6 and 9. The increase of temperature will cause the diameter of the holes to grow larger uniformly in all directions, while the action of the centrifugal force results in a larger increase of the diameter as seen in the circumferential direction than in a direction at right angles thereto. Due to the increase of temperature the conical bolts, however, will also grow larger. The holes will thus tend to take an oval shape, when the disks are under tension. This tendency, however, will be compensated by the slots 8 and 13 formed in the flanges in alinement with the axial diameter of the holes whereby the internal stresses within the material of the flanges around the holes are considerably reduced.

Considering, for instance, the outer connection through the bolt 9, it will be seen, that the diameter of element 3 will increase due to centrifugal stresses with the result that also the hole in the flange 11 engaged by the bolt will be widened. The member 3 will consequently tend to move outwardly on the bolts 9. Owing, however, to the conical shape of the latter, the interconnection of the members 3 and 2 will remain firm, the taper of the conical bolts being chosen so as to approximately correspond to the increase of the diameter of the hole.

The same result will, of course, be obtained as to the connection between the members 1 and 2.

What I claim is:—

1. A radial turbine comprising a plurality of annular turbine elements surrounding each other in succession, and radially arranged, conical, inwardly tapering bolts connecting said elements.

2. In a radial turbine, the combination with turbine disks, divided into a plurality of annular elements surrounding each other in succession, of annular flanges on said elements, and inwardly tapering radial bolts, each of which engages holes formed in adjacent flanges of two adjacent annular elements.

3. In a radial turbine, the combination with turbine disks, divided into a plurality of annular elements, surrounding each other in succession, of annular flanges on said elements, and inwardly tapering radial bolts, each of which engages holes formed in two concentric flanges of two adjacent annular elements, the outer-most one of said two elements being slit axially outside each such bolt.

In testimony whereof I have signed my name.

OSCAR ANTON WIBERG.